United States Patent
Herring et al.

(10) Patent No.: US 10,997,414 B2
(45) Date of Patent: May 4, 2021

(54) METHODS AND SYSTEMS PROVIDING ACTIONS RELATED TO RECOGNIZED OBJECTS IN VIDEO DATA TO ADMINISTRATORS OF A RETAIL INFORMATION PROCESSING SYSTEM AND RELATED ARTICLES OF MANUFACTURE

(71) Applicant: Toshiba Global Commerce Solutions Holdings Corporation, Tokyo (JP)

(72) Inventors: Dean Herring, Youngsville, NC (US);
Brad Johnson, Raleigh, NC (US);
Adrian Rodriguez, Durham, NC (US);
Brian Young, Apex, NC (US);
Jonathan Waite, Cary, NC (US)

(73) Assignee: Toshiba Global Commerce Solutions Holdings Corporation

( * ) Notice: Subject to any disclaimer, the term of this patent is extended or adjusted under 35 U.S.C. 154(b) by 195 days.

(21) Appl. No.: 16/369,718

(22) Filed: Mar. 29, 2019

(65) Prior Publication Data
US 2020/0311422 A1  Oct. 1, 2020

(51) Int. Cl.
*G06K 9/00* (2006.01)
*G06Q 10/06* (2012.01)

(52) U.S. Cl.
CPC ..... *G06K 9/00664* (2013.01); *G06K 9/00718* (2013.01); *G06K 9/00771* (2013.01); *G06Q 10/063* (2013.01)

(58) Field of Classification Search
None
See application file for complete search history.

(56) References Cited

U.S. PATENT DOCUMENTS

| | | | |
|---|---|---|---|
| 9,036,028 B2 | 5/2015 | Buehler | |
| 9,158,975 B2 | 10/2015 | Lipton et al. | |
| 9,740,977 B1 | 8/2017 | Moon et al. | |
| 9,818,126 B1 | 11/2017 | Faith et al. | |
| 10,007,849 B2 | 6/2018 | Bataller et al. | |
| 10,055,853 B1 | 8/2018 | Fisher et al. | |
| 10,078,787 B2 | 9/2018 | Carey | |
| 2004/0130620 A1* | 7/2004 | Buehler | G06K 9/32 348/143 |

(Continued)

OTHER PUBLICATIONS

Dwivedi; *Using Object Detection for a Smarter Retail Checkout Experience*; https://towardsdatascience.com; 6 pages; Jan. 10, 2019.

(Continued)

*Primary Examiner* — Delomia L Gilliard
(74) *Attorney, Agent, or Firm* — Stanek Lemon Crouse & Meeks, P.A.

(57) ABSTRACT

Method of processing video data in a retail information processing system can include recognizing an object within a video data feed to provide a recognized object within a retail environment. A context for the recognized object can be determined and a plurality of possible actions can be provided on an electronic display to an administrator of the retail information processing system, where the plurality of possible actions limited to only actions taken in the context for the recognized object. A selection from among the plurality of possible actions to be taken in the context for the recognized object can be received to provide a selected action relative to the recognized object.

20 Claims, 5 Drawing Sheets

(56) References Cited

U.S. PATENT DOCUMENTS

| | | | |
|---|---|---|---|
| 2008/0306787 A1* | 12/2008 | Hamilton | G06Q 10/0639 |
| | | | 705/7.38 |
| 2010/0002082 A1* | 1/2010 | Buehler | G08B 13/19693 |
| | | | 348/159 |
| 2011/0288938 A1* | 11/2011 | Cook | G06Q 30/0643 |
| | | | 705/14.66 |
| 2013/0235206 A1* | 9/2013 | Smith | G06Q 10/087 |
| | | | 348/150 |
| 2013/0290106 A1* | 10/2013 | Bradley | G06Q 90/20 |
| | | | 705/14.64 |
| 2014/0365273 A1 | 12/2014 | Hurewitz | |
| 2015/0208043 A1* | 7/2015 | Lee | G06Q 10/06311 |
| | | | 348/150 |
| 2016/0259339 A1* | 9/2016 | High | G01S 1/7038 |
| 2017/0148005 A1* | 5/2017 | Murn | G06Q 10/087 |
| 2017/0244608 A1* | 8/2017 | Reaux-Savonte | H04L 41/16 |
| 2018/0018508 A1 | 1/2018 | Tuseh | |
| 2018/0197218 A1 | 7/2018 | Mallesan et al. | |
| 2019/0005479 A1* | 1/2019 | Glaser | G06K 9/00288 |
| 2019/0236531 A1* | 8/2019 | Adato | G06Q 10/087 |
| 2020/0184230 A1* | 6/2020 | Liu | G06K 9/00342 |
| 2020/0184442 A1* | 6/2020 | Gu | G07G 1/0054 |
| 2020/0184444 A1* | 6/2020 | Gu | G06Q 20/206 |
| 2020/0184447 A1* | 6/2020 | Gu | G06N 20/00 |
| 2020/0279240 A1* | 9/2020 | Glaser | G06Q 20/208 |

OTHER PUBLICATIONS

Max; *People Tracking: 15 Technologies in 2018*; https://behavioranalyticsretail.com; Jan. 10, 2019;18 pages.

* cited by examiner

METHODS AND SYSTEMS PROVIDING ACTIONS RELATED TO RECOGNIZED OBJECTS IN VIDEO DATA TO ADMINISTRATORS OF A RETAIL INFORMATION PROCESSING SYSTEM AND RELATED ARTICLES OF MANUFACTURE

FIELD

The present invention relates to the field of information processing in general, and more particularly, to image processing systems.

BACKGROUND

It is known to use image processing techniques to recognize common objects within image data as discussed, for example, on the Internet at github.com/BVLC/caffe/wiki/Model-Zoo, which is hereby incorporated herein by reference.

SUMMARY

Embodiments according to the present invention can include methods of providing triggers related to recognized objects in video feeds to administrators of retail systems and articles of manufacture. Pursuant to these embodiments, methods of processing video data in a retail information processing system can include recognizing an object within a video data feed to provide a recognized object within a retail environment. A context for the recognized object can be determined and a plurality of possible actions can be provided on an electronic display to an administrator of the retail information processing system, where the plurality of possible actions limited to only actions taken in the context for the recognized object. A selection from among the plurality of possible actions to be taken in the context for the recognized object can be received to provide a selected action relative to the recognized object.

In some embodiments, a non-transitory computer-readable medium whose contents, when executed by a computing system, cause the computing system to perform operations for processing video data in a retail information processing system can include recognizing an object within a video data feed to provide a recognized object within a retail environment. A context for the recognized object can be determined and a plurality of possible actions can be provided on an electronic display to an administrator of the retail information processing system, where the plurality of possible actions limited to only actions taken in the context for the recognized object. A selection from among the plurality of possible actions to be taken in the context for the recognized object can be received to provide a selected action relative to the recognized object.

In some embodiments, a system of processing video data in a retail environment can include a processor circuit that can be configured to recognize an object within a video data feed to provide a recognized object within a retail environment and determine a context for the recognized object. An electronic display can be coupled to the processor circuit, where the processor circuit can be further configured to provide a plurality of possible actions on the electronic display to an administrator of the system, where the plurality of possible actions can be limited to only actions taken in the context for the recognized object, where the processor circuit can be further configured to receive a selection from among the plurality of possible actions to be taken in the context for the recognized object to provide a selected action relative to the recognized object.

DETAILED DESCRIPTION OF EMBODIMENTS ACCORDING TO THE INVENTION

Figure 1:
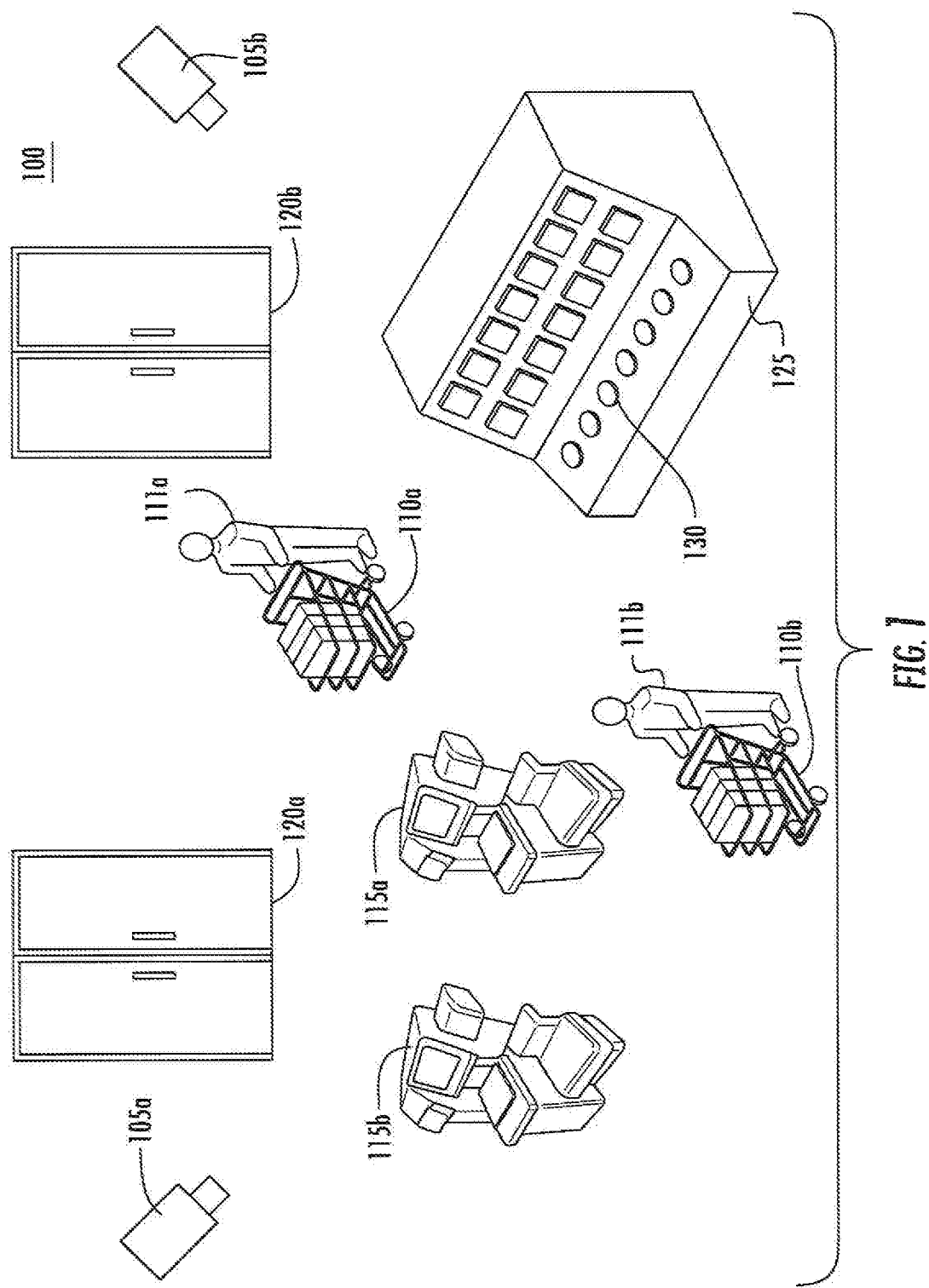
FIG. 1 is a schematic illustration of a retail environment including a plurality of recognized objects that may be viewable in video data in some embodiments according to the invention.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, a retail information processing system can provide an administrator of the system with possible options for actions (relative to recognized objects) that can be taken when certain triggers (sometimes called "events") occur relative to those recognized objects. The possible options for the actions can be limited to the context of the recognized object. Conversely, actions which are not within the context of the recognized object may not be presented as possible actions that may be taken when the trigger occurs. For example, if the recognized object is a "door" within a video data feed of a retail environment, the possible actions that can be presented to the administrator for selection can be limited to only actions that can be done to a door. Accordingly, in some embodiments a possible action may include 1) count a customer that walks through the door, 2) lock the door, and 3) sound an alarm if the door is open for more than a certain time. However, other actions may not be presented to the administrator as options because those actions are not within the context of a door such as 1) picked up, 2) put in basket, and 3) replaced, as those actions are not performed on a door. It will be further understood, however, that the above actions that are not provided as options to the administrator may be provided as possible actions relative to another recognized object such as an item that the store offers for sale to shoppers.

Therefore, a display of the retail information processing system may only show the possible actions in the context of a recognized object (such as a door) so that the administrator can more easily configure the system to provide information regarding the operation of the store (such as counting customers entering/exiting a door). Further, multiple objects can be recognized within the same environment and each may be offered a different set of possible actions so that information for an entire retail environment may be processed by the system.

In still further embodiments, the administrator may change the selected action for a particular recognized object when, for example, the conditions within the retail environment change. It will be further understood that the possible actions may be separated into sub-categories such that a possible action may have several associated sub-actions presented as part of a menu structure on the display to allow for convenient usage (and modification) by the administrator. Still further, possible actions (and sub-actions) may be conditional in that those actions may only be taken if another event occurs where the condition may not necessarily be within the context of the recognized object. For example, a customer may be counted when that customer walks through a door (an action) only during certain times of the day.

In still further embodiments, the context for a particular recognized object may be defined in advance such as when a limited number of actions are offered by the system as options to the administrator. In other embodiments according the invention, the context can be determined by an artificial intelligence system or service that defines the possible actions for the recognized objects based on an evolving set of data that may reflect other environments as well as a retail environment, or be fixed in time such that if the use or capabilities of a recognized object changes after the system is deployed, the context for the recognized objects may continue to evolve without relying entirely on a pre-defined context for each recognized object. In some embodiments, the artificial intelligence system can use a Deep Neural Network architecture that can be initially trained and then periodically re-trained to define certain new actions as being within the context. In some embodiments, the artificial intelligence system or service can provide the functions described herein as attributed to the administrator, so that a more automated approach may be used. In some embodiments, the artificial intelligence system can use a combination of the elements and approaches described above.

FIG. 1 is a schematic illustration of a retail environment 100 including a plurality of recognized objects that may be viewable in video data in some embodiments according to the invention. According to FIG. 1, the retail environment 100 can be a grocery store where shoppers enter the premises, shop and pay for items, and exit the store. An administrator may be responsible for monitoring activities at the retail environment 100 and for operating an information processing system to gather information regarding those activities so as to ensure efficient operations.

In particular, the retail environment 100 may include objects that are recognized as having certain properties including how those objects are utilized by shoppers, for example, during operations. As shown in FIG. 1, retail environment 100 can include recognized objects such as an entry door 120b, an exit door 120a, point of sale (POS) systems 115a and 115b, items 130 stored in a display 125 that are offered for purchase by shoppers 11a and 11b, and shopping carts 110a and 110b each of which may be associated with a respective one of the shoppers 11a and 11b. Activities in the retail environment 100 can be monitored using video cameras 105a and 105b each of which can provide respective video data to the system. It will be understood that the environment 100 can include more recognized objects than those shown and may include types of recognized objects other than those shown. It will be understood that the system may process the video data to generate the recognized objects or may have access to predefined recognized objects that are expected to be detected in the video data, or a combination of both approaches. In some embodiments, the particular environment (such as the retail environment) may be recognized using the video data.

The administrator may use the system to setup processes that allow certain actions to be taken when a recognized object is subjected to a trigger. For example, the administrator may wish to collect data related to the exit door 120a. Accordingly, the administrator can designate the recognized object of the exit door 120a to have an action taken (for example a count) when a customer walks through the exit door 120a (i.e., a trigger).

As appreciated by the present inventors, to collect data on a wide range of recognized objects in response to a large number of triggers, the administrator may need to code each of the actions and triggers in a conventional approach. Accordingly, in some embodiments, the system may provide an interface that presents only actions that relate to the context of the recognized object on which data is to be collected. Moreover, actions which do not relate to the context of the recognized object may not be presented as one of the possible actions that may be taken responsive to a trigger. In operation, the administrator can select a wide range of recognized object and be presented only with possible selections that are within the context of that recognized object. For example, if the administrator selects a door, only actions that relate to a door are presented as possible selections that administrator can choose whereas when the administrator selects a POS system for data collection, only actions that relate to POS systems are presented as possible selections on the interface. It will be further understood that the administrator can include the artificial intelligence system or service as shown, for example, in FIG. 5.

Still referring to FIG. 1, if the administrator selects the item 130 in the display 125 for data collection, the system may display a range of possible actions that may be taken in the context of the item 130 when a trigger is detected relative to the item 130. For example, the system may display: adjust count if the item 130 is picked up, adjust count if the item 130 is placed in the basket; adjust count if the item 130 is replaced, adjust count if item 130 is looked at, as some of the possible actions that may be taken relative to the item 130. Still further the system may not offer actions that are, for example, associated with the context of the exit door 120a.

As described above, the system may detect when the shopper approaches and touches the item 130 as a trigger which can cause the selected action, such as adjusting the count when the item is picked up. Still further the system may take other actions is response to other triggers relative to the same item 130 such as the action of adjusting the count when the item 130 is placed in the shopping cart 110 when the shopper 111 picks up the item 130.

The administrator may also elect to collect data at the point of sale (POS) system 115 using actions such as auditing the checkout of the shopper 111 in response to detecting when the shopping cart 110 approaches the POS system 115. It will be further understood that the administrator may configure the operation of the system to provide all of the operations described herein simultaneous or concurrent with one another such that multiple types of data collection may be carried out using a user interface of the system as described herein.

Figure 2:
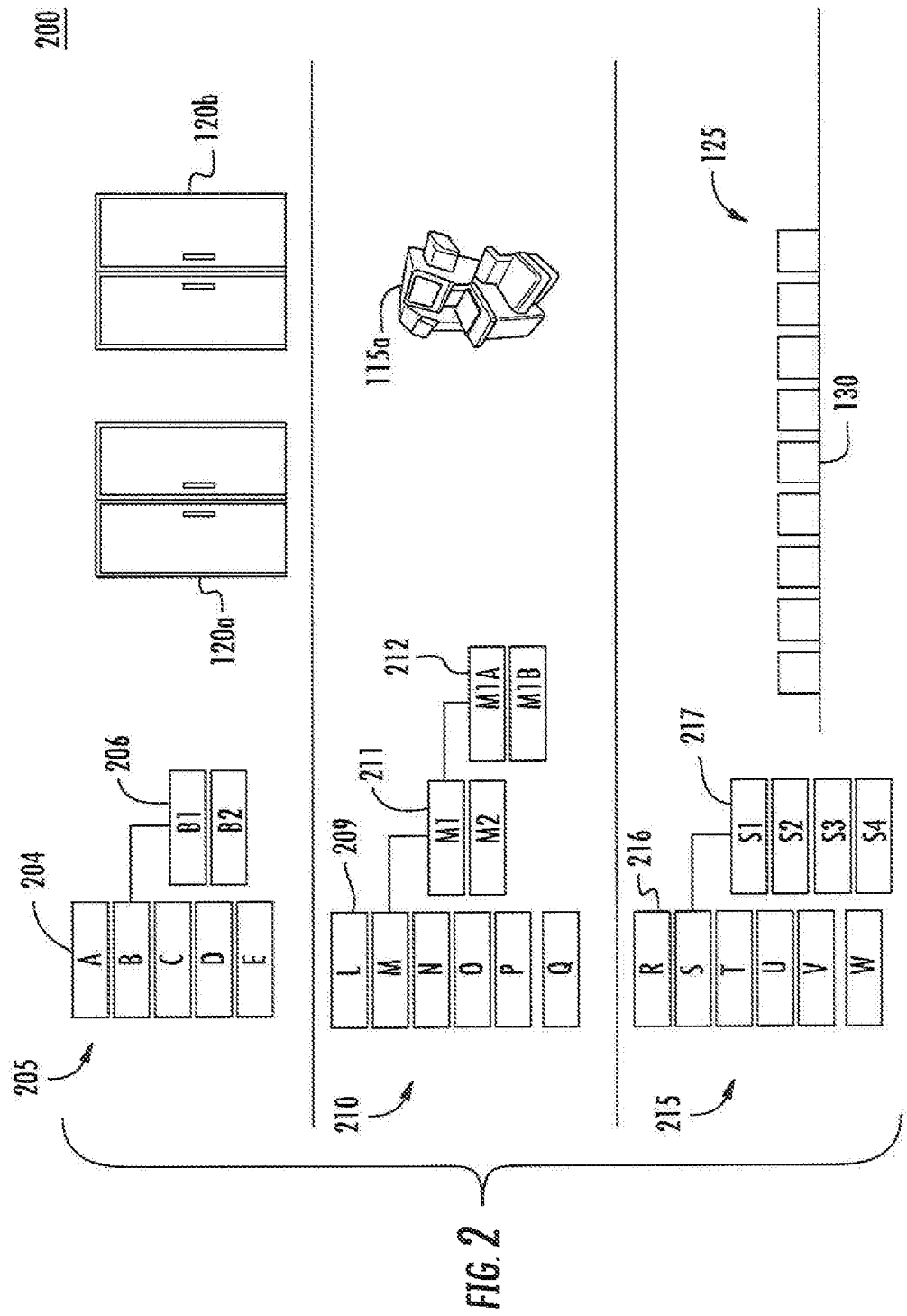
FIG. 2 is a schematic illustration of an interface included in a system for processing video data of a retail environment to show recognized objects and possible actions to be taken in response to triggers interacting with the recognized objects in some embodiments according to the invention.

FIG. 2 is a schematic illustration of an interface 200 included in the system for processing video data of the retail environment 100 to show recognized objects and offer the selection of possible actions to be taken in response to triggers interacting with the recognized objects in some embodiments according to the invention. According to FIG. 2, the interface 200 maybe a graphical user interface provided as part of a display that is operatively coupled to a remainder of the system that provides the operations described herein.

As shown in FIG. 2 the interface 200 can include a plurality of regions each of which can be used to control the collection of data for a respective recognized object within the retail environment 100 by processing video data associated with the recognized objects for which data is to be collected. For example, the upper portion of the interface 200 can be associated with data collection and actions taken on the exit door 120a, whereas the center portion of the interface 200 can be associated with data collection and actions taken on the POS systems 115, and the lower portion of the interface 200 can be used for data collection and actions taken on items 130 as shown in FIG. 1. It will be understood that the icons shown on the right hand of the display 200 can represent a portion of the video data that includes the recognized objects that are managed by the respective portion of the display 200.

Still referring to FIG. 2, the upper portion of the interface 200 can display a graphical representation of the exit door 120a so that the administrator may more easily recognize where the possible actions for data collection relative to the exit door 120a can be found. Further, the left side of the upper portion of the interface 200 can be used to display a hierarchy of the possible actions 205 that may be taken relative to the exit door 120a. In some embodiments, the hierarchy of the possible actions 205 can be buttons where each has an associated possible action that may be taken on the exit door 120a. In some embodiments, the hierarchy of the possible actions 205 can be a hierarchy of menus including multiple levels. In particular, the hierarchy of the possible actions 205 can include a first level 204 and a second level 206 that can include sub-actions that are related to the action that is selected from the first level 204.

It will be further understood that the hierarchy of the possible actions 205 includes only actions which can be taken in the context of the exit door 120a. In particular, the first level 204 of the hierarchy can include possible actions A-E such as alarm, lock, open, display a message, and send an alert, respectively and other actions that may facilitate the data collection relative to the exit door 120a. The second level 206 can also include sub-actions B1-B2 that can be taken on the exit door 120a and, specifically, relate to a particular selection B at the first level 204. Accordingly, the second level 206 can include multiple sets of sub-actions B1-B2 where each set is related to one of the actions at the first level 204. The respective set of sub-actions B1-B2 at the second level 206 can be displayed (as available for selection) when the related action at the first level 204 is selected by the administrator.

Accordingly, if the administrator selects the alarm action at the first level 204 the selections shown at the second level 206B-B2 can be displayed including sub-actions such as: B1) if the shopper approaches the exit door 120a with without first paying at a POS system 115 the exit door 120a is not opened. The second level 206 can also provide a sub-action B2 that if the shopper approaches the exit door 120a after paying at the POS system 115 a thank you message is displayed to the shopper. Accordingly, security at the retail (or other) environment may be improved using the sub-action B2 as the alarm. Other sub-actions may also be provided at the second level 206 of hierarchy 205.

As further shown in FIG. 2, a hierarchy of the possible actions 210 can also be provided for the collection of data associated with the POS systems 115. The hierarchy of the possible actions 210 can include a first level of hierarchy 209, a second level of hierarchy 211, and a third level of hierarchy 212. The first level of hierarchy 209 can include possible actions L-Q such as an audit action that when selected causes the system to display the second level 211 including possible actions M1-M2 including a sub-action M1 to ensure that the shopper 111 removes everything from the shopping cart 110 and places in onto the POS system 115. Further, if the M1 selection is made by the administrator, the third level of hierarchy 212 can be displayed including additional possible sub-actions M1A-M1B that can be taken in response to triggers at the point of sale system in the context of the audit at the POS system 115. For example, when a trigger is detected, the selected action M1A may cause the system to increment a count of the items 130.

Referring still to FIG. 2, a hierarchy of the possible actions 215 can be provided for the collection of data associated with the items 130 offered for sale. The hierarchy of the possible actions 215 can include a first level of hierarchy 216 and a second level of hierarchy 217. The first level of hierarchy 216 can include a possible actions R-W: item picked up which can cause a counter indicating the number of times that the items 130 is picked up to be adjusted. If the administrator selects action S the second level 217 can be displayed which can include further possible actions S1-S4 that are available for selection, all of which can be within the context of the item 130. For example, some of the possible actions in the second level 217 which may be offered as available on the display 200 can include an action to count that the item has been placed in the shopping cart 110, an action to increase the counter, reduce the counter, which may be triggered when the system detects that the shopper 11 has placed the item 130 back onto the shelf of the display 125. Still further another action at the second level 217 can be to adjust a counter for the number of times shoppers look at an adjacent item 130 which can be triggered when the system detects that the shopper 111 looks at the adjacent item when the item 130 is picked up. Other actions may also be provided as part of the second level 217. Another action at the second level may include where the shopper 111 hands the item 130 to another shopper 111 or to a store employee.

Figure 3:
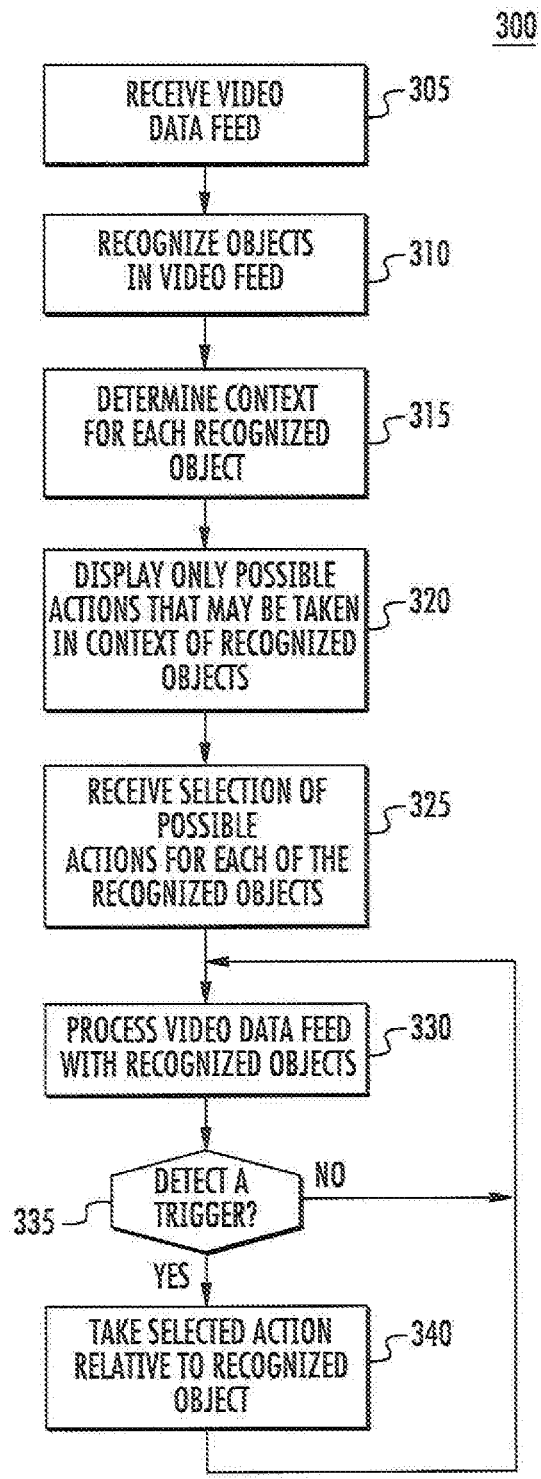
FIG. 3 is a flowchart illustrating operations of a retail information processing system to provide possible actions to administrators taken in response to triggers interacting with the recognized objects in some embodiments according to the invention.

FIG. 3 is a flowchart illustrating operations 300 of the retail information processing system to provide possible actions to administrators taken in response to triggers interacting with the recognized objects in some embodiments according to the invention. According to FIG. 3, operations 300 can begin when the system receives the video data as part of the feed from the video cameras 105 shown in FIG. 1 (block 305). The system can analyze the video feeds to determine the recognized objects within retail environment 100 (block 310) and determine a context for each of the recognized objects (block 315). It will be understood that the system may display only the actions that may be taken in the context of the recognized objects (block 320).

The administrator then selects one of the possible actions that can be taken for a particular one of the recognized objects in response to a particular trigger (block 325). It will be further understood that block 325 can also include a selection of each of the respective recognized objects in the environment such that the administrator may select a different action for each of the selected recognized objects whereupon processing may be performed on triggers associated with each of the objects selected for action in response to detecting those triggers.

The system then continues to process the video data feed with the recognized objects (block 330) with the objective of detecting triggers in the video data feed (block 335). If no trigger is detected, processing continues at block 330. If a trigger is detected (block 335) the action that is selected for the recognized object that is the subject of the detected trigger is taken (block 340). Processing continues at block 330 to detect any further triggers with respect to any of the recognized objects having actions selected for processing.

Figure 4:
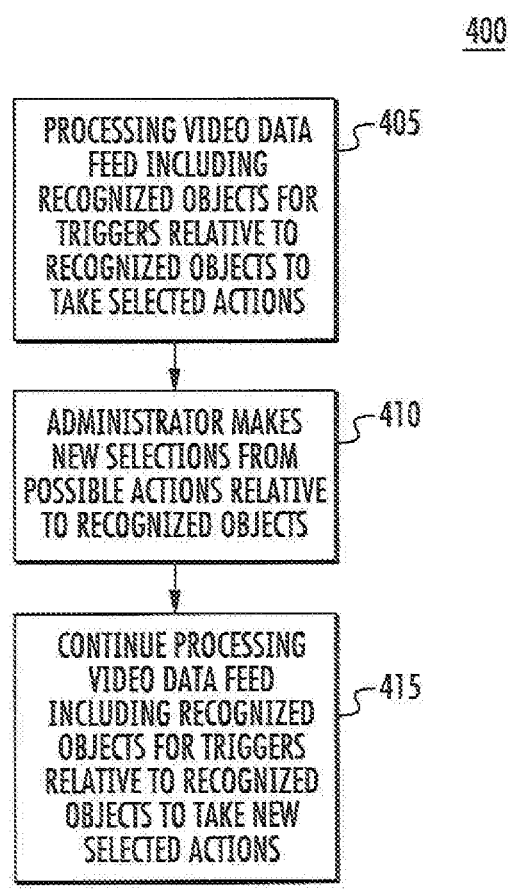
FIG. 4 is a flowchart illustrating operations of a retail information processing system to allow administrators to alter possible actions taken in response to triggers interacting with the recognized objects in some embodiments according to the invention.

FIG. 4 is a flowchart illustrating operations 400 of the retail information processing system to allow administrators to alter possible actions taken in response to triggers interacting with the recognized objects in some embodiments according to the invention. According to FIG. 4 operations 400 begin after the administrator has selected certain ones of the recognized objects for processing, including selecting actions that are to be taken in the context of the selected recognized objects based on detected triggers (block 405). The administrator may alter the selected actions to be taken in response to triggers for a recognized object having a previously associated selection (block 410). In other words, the administrator can elect to change the action to be taken relative to a recognized object. In response to that same trigger (block 410) the system may then continue processing the video data feed that includes the recognized objects to detect triggers relative to those recognized objects and take the newly selected actions (block 415).

Figure 5:
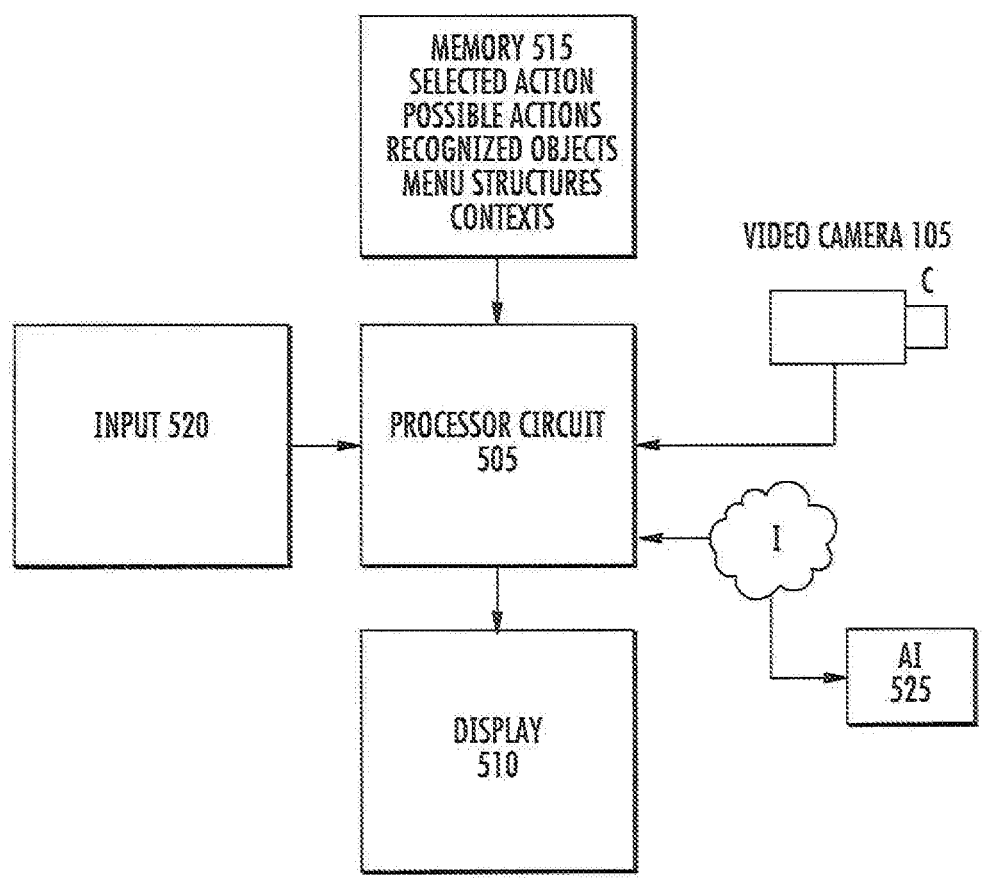
FIG. 5 is a block diagram of a retail information processing system configured to provide possible actions to administrators taken in response to triggers interacting with the recognized objects in some embodiments according to the invention.

FIG. 5 is a block diagram of a retail information processing system 500 configured to provide possible actions to administrators taken in response to triggers interacting with the recognized objects in some embodiments according to the invention. According to FIG. 5, the system 500 includes a processor circuit 505 that the coordinates overall operations of the system 500. As further shown in FIG. 5 the processor circuit 505 receives the video data feed from the video camera 105. It will be further understood that although a single video camera 105 is shown, additional video cameras can also be used to provide respective video data feeds to the processor circuit 505.

As further shown in FIG. 5 the processor circuit 505 can be coupled to an input 520 that can be operatively coupled to the display 510 which is also shown in FIG. 2. In operation, the administrator can use the input 520 in conjunction with the display 510 to select one or more of the possible actions provided by the system within the context of the recognized object selected for collection of data. The display 510 can be the graphical user interface that is schematically illustrated in FIG. 2.

The system 500 can also include a memory 515 that is operatively coupled to the processor circuit 505. The memory 515 can store data such as the possible actions that are offered for the recognized objects, data for recognized objects, data for the hierarchies shown in FIG. 2, data for the contexts that are associated with the recognized objects, and data for the actions selected for particular ones of the recognized objects. It will be further understood that the selected actions can be updated by the system 500 in response to input from the administrator as describe for example in reference to FIG. 4.

As further shown in FIG. 5 the processor circuit 505 can be coupled to an artificial intelligence system or service 525 via a network such as the Internet. The artificial intelligence system 525 can be used to provide the revised or evolving context data for each of the recognized objects processed by the system. Still further, the system 500 may be configured to allow the processor circuit 505 to forward new recognized objects to the artificial intelligence system 525 for the derivation of context information thereon which can be returned to the processor circuit 505 and stored in the memory 515 which can then in turn be used to define which of the actions may be possible for the recognized objects, including the newly discovered recognized objects with the defined context.

As described herein, in some embodiments the system may provide a graphical interface that presents only actions that relate to the context of the recognized object on which data is to be collected. Moreover, actions which do not relate to the context of the recognized object may not be presented as one of the possible actions that may be taken responsive to a trigger. In operation, the administrator can select a wide range of recognized object and be presented only with possible selections that are within the context of that object. For example, if the administrator selects a door only actions that relate to a door are presented as possible selections that administrator can choose whereas when the administrator next selects a POS system for data collection, only actions that relate to POS systems are presented as possible selections on the graphical interface.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed:

1. A method of processing video data in a retail information processing system, the method comprising:
   recognizing an object within a video data feed to provide a recognized object within a retail environment;
   determining a context for the recognized object;
   providing a plurality of possible actions on an electronic display to an administrator of the retail information processing system, the plurality of possible actions limited to only actions taken in the context for the recognized object;
   receiving, from the administrator at the electronic display, a selection from among the plurality of possible actions to be taken in the context for the recognized object to provide a selected action relative to the recognized object to be taken in response to detecting an event in the video data feed that is within the context for the recognized object;
   beginning processing the video data feed to detect an occurrence of the event relative to the recognized object; and taking the selected action relative to the recognized object only if the event detected in the video data feed is within the context for the recognized object.

2. The method of claim 1 wherein determining the context for the recognized object comprises:
using the recognized object within the retail environment to access a database of global possible actions that includes the plurality of possible actions, wherein the plurality of possible actions are pre-defined as being within the context for the recognized object.

3. The method of claim 1 wherein determining the context for the recognized object comprises:
determining that the plurality of possible actions are within the context for the recognized object using an artificial intelligence system.

4. The method of claim 1 further comprising:
detecting the event associated with the recognized object;
transmitting an instruction to perform the selected action if the event comprises a trigger for the selected action relative to the recognized object.

5. The method of claim 4 wherein the recognized object comprises a first recognized object, the method further comprising:
transmitting the instruction to perform the selected action relative to the first recognized object if the trigger includes a second recognized object that interacts with the first recognized object.

6. The method of claim 5 wherein the recognized object within the retail environment comprises a door, the method further comprising:
providing the plurality of possible actions on the electronic display to include a count of customers walking through the recognized object, sounding an alarm when the recognized object is opened, and sounding an alarm when the recognized object is closed; and
not providing as one of the plurality of possible actions on the electronic display a count of a number of times the recognized object is placed in a cart, a count of a number of times the recognized object is looked at, and a count of a number of times the recognized object is picked up.

7. The method of claim 5 wherein the recognized object within the retail environment comprises a product, the method further comprising:
not providing the plurality of possible actions on the electronic display to include a count of customers walking through the recognized object, sounding an alarm when the recognized object is opened, and sounding an alarm when the recognized object is closed; and
providing as one of the plurality of possible actions on the electronic display a count of a number of times the recognized object is placed in a cart, a count of a number of times the recognized object is looked at, and a count of a number of times the recognized object is picked up.

8. The method of claim 1 wherein providing the plurality of possible actions on the electronic display to the administrator of the retail information processing system comprises displaying the plurality of possible actions on the electronic display as part of a pull-down menu.

9. The method of claim 1 wherein providing the plurality of possible actions on the electronic display to the administrator of the retail information processing system is responsive to selection of the recognized object by the administrator of the retail information processing system.

10. The method of claim 4 wherein the recognized object is a first recognized object at a first location in the retail environment and the event is a first event, the method further comprising:
detecting a second event associated with a second recognized object, wherein the second recognized object is in the same category as the first recognized object in a second location in the retail environment;
not transmitting the instruction to perform the selected action if the event comprises the trigger for the selected action relative to the second recognized object responsive to the second recognized object being in the second location.

11. A non-transitory computer-readable medium whose contents, when executed by a computing system, cause the computing system to perform operations for processing video data in a retail information processing system comprising:
recognizing an object within a video data feed to provide a recognized object within a retail environment;
determining a context for the recognized object;
providing a plurality of possible actions on an electronic display to an administrator of the retail information processing system, the plurality of possible actions limited to only actions taken in the context for the recognized object;
receiving, from the administrator at the electronic display, a selection from among the plurality of possible actions to be taken in the context for the recognized object to provide a selected action relative to the recognized object to be taken in response to detecting an event in the video data feed that is within the context for the recognized object;
beginning processing the video data feed to detect an occurrence of the event relative to the recognized object; and
taking the selected action relative to the recognized object only if the event detected in the video data feed is within the context for the recognized object.

12. The non-transitory computer-readable medium of claim 11 wherein determining the context for the recognized object comprises:
using the recognized object within the retail environment to access a database of global possible actions that includes the plurality of possible actions, wherein the plurality of possible actions are pre-defined as being within the context for the recognized object.

13. The non-transitory computer-readable medium of claim 11 wherein determining the context for the recognized object comprises:
determining that the plurality of possible actions are within the context for the recognized object using an artificial intelligence system.

14. The non-transitory computer-readable medium of claim 11 further comprising:
detecting the event associated with the recognized object;
transmitting an instruction to perform the selected action if the event comprises a trigger for the selected action relative to the recognized object.

15. The non-transitory computer-readable medium of claim 14 wherein the recognized object comprises a first recognized object, the non-transitory computer-readable medium further comprising:
transmitting the instruction to perform the selected action relative to the first recognized object if the trigger includes a second recognized object that interacts with the first recognized object.

16. The non-transitory computer-readable medium of claim 15 wherein the recognized object within the retail environment comprises a door, the non-transitory computer-readable medium further comprising:

provuding the plurality of possible actions on the electronic display to include a count of customers walking through the recognized object, sounding an alarm when the recognized object is opened, and sounding an alarm when the recognized object is closed; and not providing as one of the plurality of possible actions on the electronic display a count of a number of times the recognized object is placed in a cart, a count of a number of times the recognized object is looked at, and a count of a number of times the recognized object is picked up.

17. A system of processing video data in a retail environment, the system comprising:

a processor circuit configured to recognize an object within a video data feed to provide a recognized object within a retail environment and determine a context for the recognized object; and an electronic display, accessed by an administrator of a retail information processing system, coupled to the processor circuit, the processor circuit further configured to;

provide a plurality of possible actions on the electronic display to the administrator, the plurality of possible actions being limited to only actions taken in the context for the recognized object, wherein the processor circuit is further configured to receive a selection, by the administrator at the electronic display, from among the plurality of possible actions to be taken in the context for the recognized object to provide a selected action relative to the recognized object to be taken in response to detecting an event in the video data feed that is within the context for the recognized object; and wherein the processor circuit is further configured to process the video data feed to detect an event relative to the recognized object and to take the selected action relative to the recognized object only if the event is within the context for the recognized object.

18. The system of claim 17 wherein the processor circuit is further configured to:

detect the event associated with the recognized object; and transmit an instruction to perform the selected action if the event comprises a trigger for the selected action relative to the recognized object.

19. The system of claim 17 wherein the processor circuit is configured to provide the plurality of possible actions on the electronic display to the administrator of the system responsive to selection of the recognized object by the administrator of the system.

20. The system of claim 17 wherein the processor circuit is configured to display the plurality of possible actions on the electronic display as part of a pull-down menu.

* * * * *

UNITED STATES PATENT AND TRADEMARK OFFICE
CERTIFICATE OF CORRECTION

PATENT NO. : 10,997,414 B2
APPLICATION NO. : 16/369718
DATED : May 4, 2021
INVENTOR(S) : Herring et al.

Page 1 of 1

It is certified that error appears in the above-identified patent and that said Letters Patent is hereby corrected as shown below:

On the Title Page

(56) References, pg. 2:
Please correct "US 2018/0018508 01-2008 Tuseh"
To read -- US 2018/0018508 01-2008 Tusch --

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*